US 6,553,508 B1

(12) United States Patent
Minyard

(10) Patent No.: US 6,553,508 B1
(45) Date of Patent: Apr. 22, 2003

(54) REDUNDANT COMMUNICATION FABRICS FOR ENHANCING FAULT TOLERANCE IN TOTEM NETWORKS

(75) Inventor: Trenton Corey Minyard, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/477,784

(22) Filed: Dec. 31, 1999

(51) Int. Cl.$^7$ ............................................... H04B 1/74
(52) U.S. Cl. ............................. 714/4; 714/43; 370/225; 370/227
(58) Field of Search .................... 714/43, 4; 370/225, 370/227

(56) References Cited

U.S. PATENT DOCUMENTS

| 4,213,201 A | * | 7/1980 | Gagnier et al. | 370/220 |
| 5,802,263 A | * | 9/1998 | Dittmar et al. | 714/4 |
| 5,996,001 A | * | 11/1999 | Quarles et al. | 714/4 |
| 6,233,704 B1 | * | 5/2001 | Scott et al. | 714/4 |
| 6,286,058 B1 | * | 9/2001 | Hrastar et al. | 714/4 |

OTHER PUBLICATIONS

Agarwal et al., A Reliable Ordered Delivery Protocol for Interconnected Local–Area Networks, 1995, IEEE, 1995 International Conference on Network Protocols, pp. 365–374.*
U.S. patent application Ser. No. 08/940,412, Koch, filed Sep. 30, 1997.
Sape Mullender, *Distributed Systems, 2$^{nd}$*, ACM Press, NY, NY (1993), pp. 255, 329–352–413–417.
David Powell, "Group Communications," *Communications of the ACM*, NY, NY, vol. 39, No.4 (Apr. 1996), pp. 50–53.
L. E. Moser, Milliar–Smith, Agarwal, Budhia and Lingley–Papadopoulous, "Totem: A Fault–Tolerant Multicast Group Communication System," *Communications of the ACM*, pp. 54–63, vol. 39, No. 4 (Apr. 1996), pp. 54–63.
Deborah A. Agarwal, "Totem: A Reliable Ordered Delivery Protocol for Interconnected Local–Area Networks" (dissertation submitted in partial satisfaction of the requirements of the Degree of Doctor of Philosophy in Electrical and Computer Engineering), University of California, Santa Barbara (Aug., 1994).

* cited by examiner

Primary Examiner—Robert Beausoliel
Assistant Examiner—Michael Maskulinski
(74) Attorney, Agent, or Firm—Carr Law Firm, L.L.P.

(57) ABSTRACT

Disclosed is a method and apparatus for providing fault tolerance in Totem Networks by use of redundant fabrics. The above is accomplished in one embodiment of the invention by operating devices on the network in such a way that the devices mark the token to indicate when the token has been switched from one fabric to another in response to a timeout. A Ring Master device on the network determines, based on switching of the token by devices on the network whether a fabric or device on a fabric of the network has failed. In addition, fabrics that have failed are monitored to determine when they have become operational. Retransmission of improperly received messages as per token-message-order protocols are also provided for situations in which the token is received before all messages intended for a given device have been properly received.

4 Claims, 5 Drawing Sheets

REDUNDANT COMMUNICATION FABRICS FOR ENHANCING FAULT TOLERANCE IN TOTEM NETWORKS

TECHNICAL FIELD

The present invention relates in general to communication systems and, more particularly, to the use of redundant communication fabrics to enhance fault tolerance in Totem communication networks.

BACKGROUND OF THE INVENTION

A number of systems have been developed for providing network communications among groups of users. One such system comprises a Totem ring network in which a plurality of devices is connected to a bus network. Each communication device includes circuitry for interfacing with the Totem ring network (e.g., transmitting and receiving messages on the Totem ring network), and a Central Processing Unit (CPU) adapted for executing processes comprising application programs effective for managing call processing, database operations, industrial control, and the like.

A Totem network provides for multicast delivery of messages, wherein messages can be transmitted and delivered to multiple locations, with assurance that the sequence in which messages are generated is maintained as the messages are transmitted and delivered throughout the system. Totem networks are well known to those skilled in the art and are described in greater detail in various technical papers and articles, such as an article entitled "Totem: A Fault Tolerant Multicast Group Communication System" by L. E. Moser et al., published in the April 1996, Vol. 39, No. 4 Edition of Communications of the Association for Computing Machinery (ACM).

In Totem networks, message delivery is controlled using a token similar to that used in a token ring system to identify which device can transmit onto the network. Periodically, such as every few milliseconds, the token is sent around the network to each device in sequence. As the token is received by each device, the device determines whether it has a message or data to transmit over the network. If a device does have a message or data to transmit over the network, it will send that data first before forwarding the token. If a device does not have a message or data to transmit over the network, then it forwards the token and sends it to the next device.

Conventionally, messages on a Totem network are transmitted and delivered over a physical medium comprising a single fabric of wires or fiber optic cable. As a consequence, while Totem networks assure that messages are transmitted and delivered in the same sequence in which they are generated, there is no assurance that the messages will be delivered at all if a fabric fails. The physical medium of a Totem network thus has no fault tolerance designed into it.

Accordingly, there is a need for a system and a method that will provide Totem networks with fault tolerance to enhance the probability that sequentially transmitted messages will be delivered across the Totem network.

SUMMARY OF THE INVENTION

The present invention accordingly provides a Totem network with multiple redundant fabrics through which messages can be transmitted and delivered. The Totem network is configured so that, if one fabric fails, another fabric can be used, thereby providing a Totem system with fault tolerance. The Totem network is also configured so that if a failed fabric has been repaired and thus becomes operational, the fabric repair can be detected and the repaired fabric declared operational so that devices on the network can use it. The Totem network is also configured so that a failure of a device on the network can be detected.

The present invention further comprises a method embodied in computer software residing on the network for controlling the use of the redundant fabrics. The computer software can be configured to detect when a fabric failure has occurred, and, after a failure has been detected, to declare the fabric to have failed so that devices on the network will use only fabrics that are operational. In the event a failed fabric has been repaired, the computer software can detect the repair and declare the formerly-failed fabric operational so that devices on the network can use it. The computer software can also be configured to detect when a device on the network has failed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention can be practiced without such specific details. In other instances, well-known elements have been illustrated in block diagram or schematic form in order not to obscure the present invention in unnecessary detail. Additionally, for the most part, details concerning the operation of Totem ring networks and the like have been omitted inasmuch as such details are not necessary to obtain a complete understanding of the present invention and are within the skills of persons of ordinary skill in the relevant art.

Figure 1:
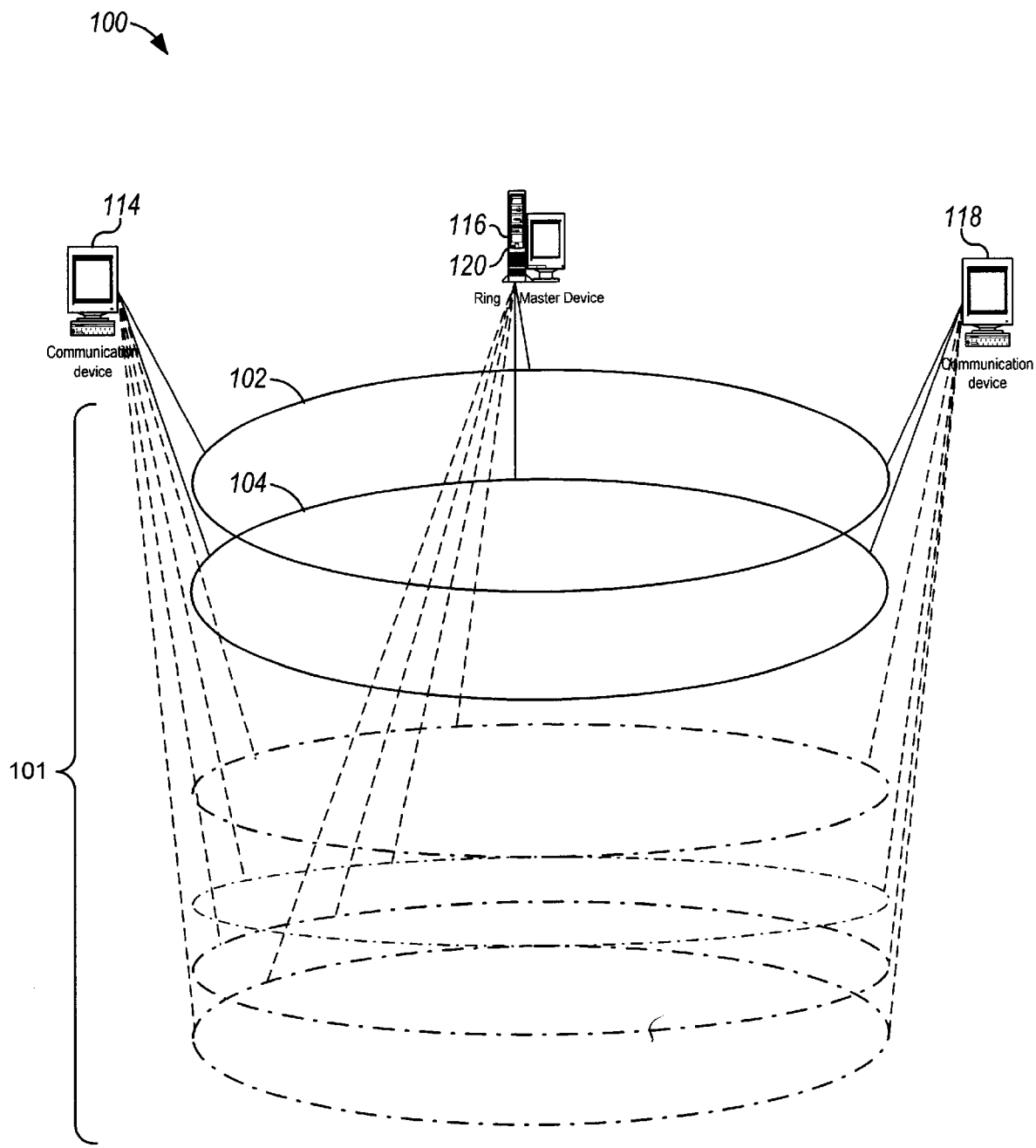
FIG. 1 is a schematic diagram of a Totem ring network embodying features of the present invention.

Referring now to FIG. 1 of the drawings, the reference numeral 100 generally designates a Totem network embodying features of the present invention. The Totem network 100 comprises a plurality of fabrics 101, two of which fabrics 102 and 104 are represented by solid-line ellipses in FIG. 1, it being understood that the network 100 may comprise any number of fabrics greater than or equal to two, as indicated by the multiple dashed-line ellipses of FIG. 1. Each fabric 102 and 104 comprises a physical medium well-known in the art, such as copper wires, fiber optic cables, or the like, and may be configured to operate using a protocol such as 10 baseT or the like.

A plurality of communication devices well-known in the art, three of which devices 114, 116, and 118 are depicted in FIG. 1, are each operably connected to each of the fabrics 102 and 104. At least one of the devices 114, 116, and 118, taken herein as the device 116, is arbitrarily chosen to serve as a ring master device of the Totem network. Any of the devices may act as the ring master; however, if the ring master fails, another device is chosen to serve as the ring master. The ring master device 116 manages tokens and messages to determine, based on fabric switching by devices 114, 116, and 118, whether a failure of any of the plurality of fabrics has occurred. The ring master device 116 also contains a local fabric switch count register 120 for each fabric that holds the number of consecutive fabric switches for the fabric.

The devices 114, 116, and 118 may comprise any conventional computer generally capable of receiving, storing, processing, and outputting data. Each of the plurality of devices 114, 116, and 118 is configured to switch transmission of a token among the plurality of fabrics in response to a timeout after transmission of a token. While not shown in detail, the devices 114, 116, and 118 include components, such as input and output devices, volatile and non-volatile memory, and the like, but, because such computer components are well known in the art, they are not shown or described in further detail herein.

Figure 2:
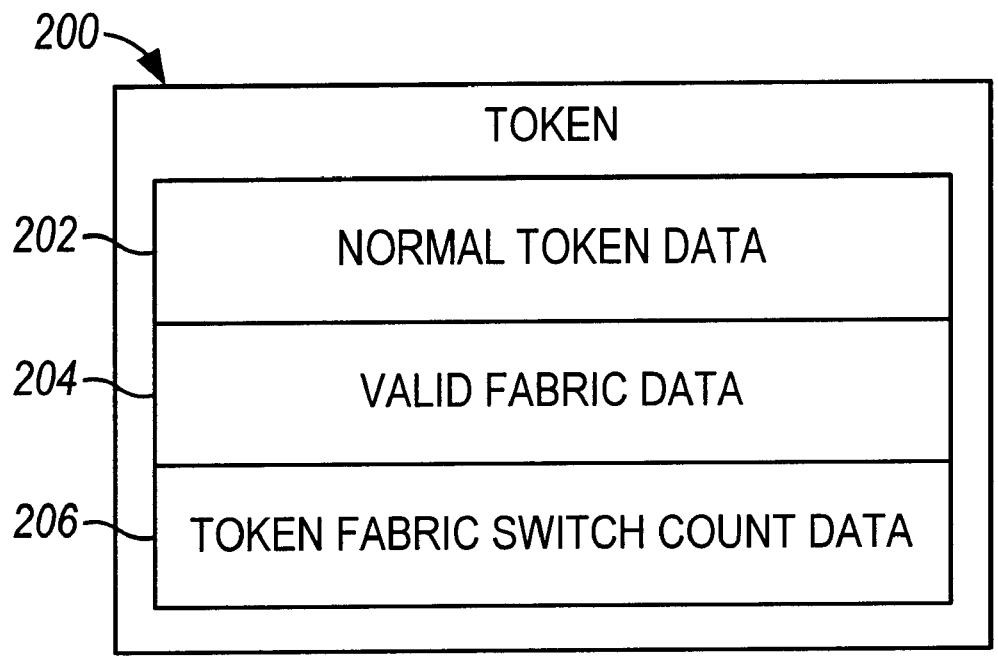
FIG. 2 depicts a high-level conceptual diagram of a token used in the network of FIG. 1.

In FIG. 2, the reference numeral 200 generally designates a token comprising a plurality of data fields, three of which fields 202, 204 and 206 are shown in FIG. 2, it being understood that the token 200 may comprise any number of data fields. The data field 202 comprises normal token data used in tokens on prior art Totem ring networks, including data identifying which device 114, 116, or 118 the token 200 is intended for, which token data is well known in the art. The data field 204 comprises information denoting which fabrics of the network 100 have failed, as determined by the ring master device 116. The data field 206 comprises information denoting the number of times that a device 114, 116 or 118 of the network 100 has switched from one of the fabrics 102 and 104 in response to a timeout following transmission of a token 200.

Figure 3:
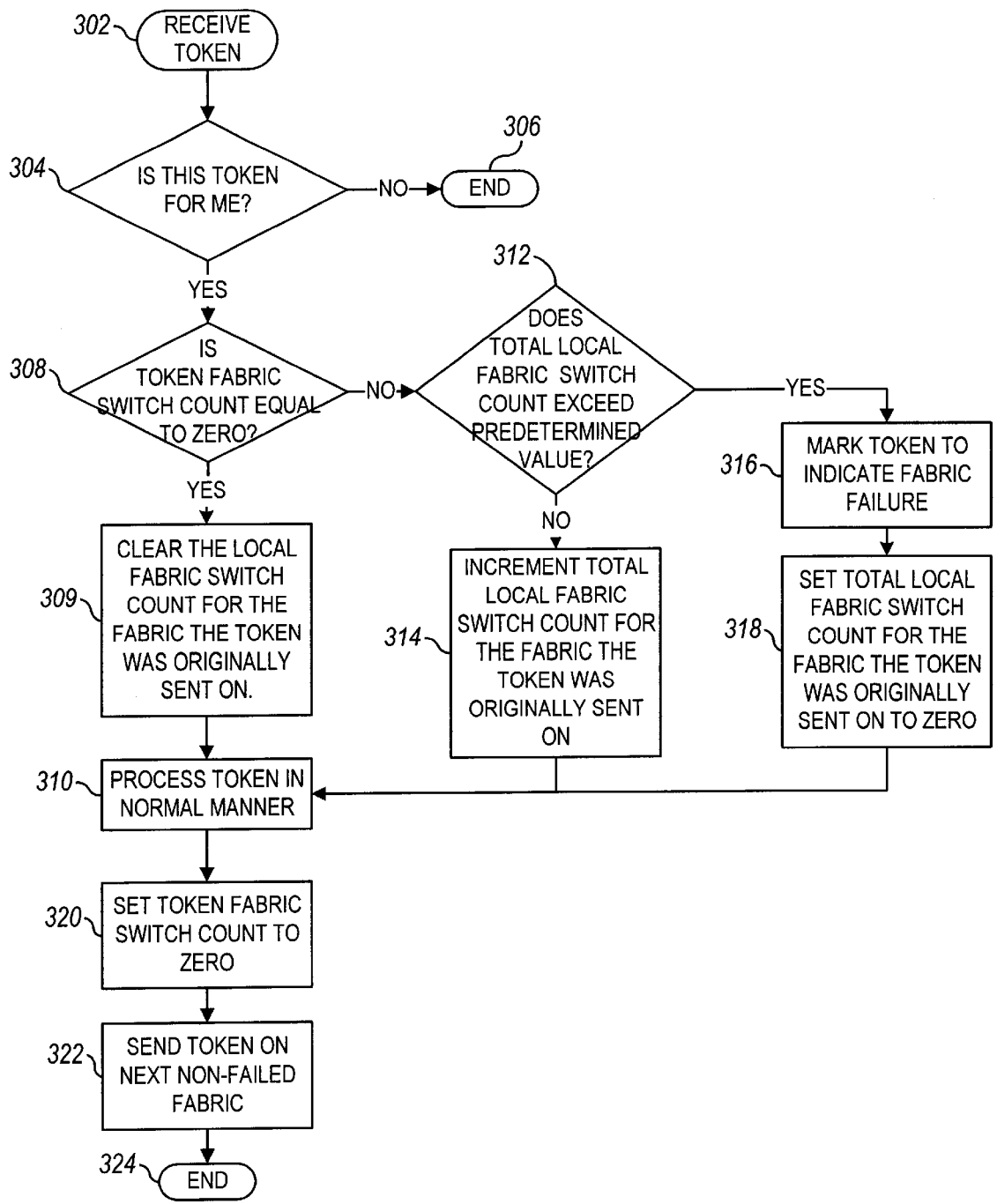
FIG. 3 is a flow chart illustrating control logic for marking a token used in connection with a ring master device connected to the network of FIG. 1 to indicate that a fabric of the network has failed.
Figure 4:
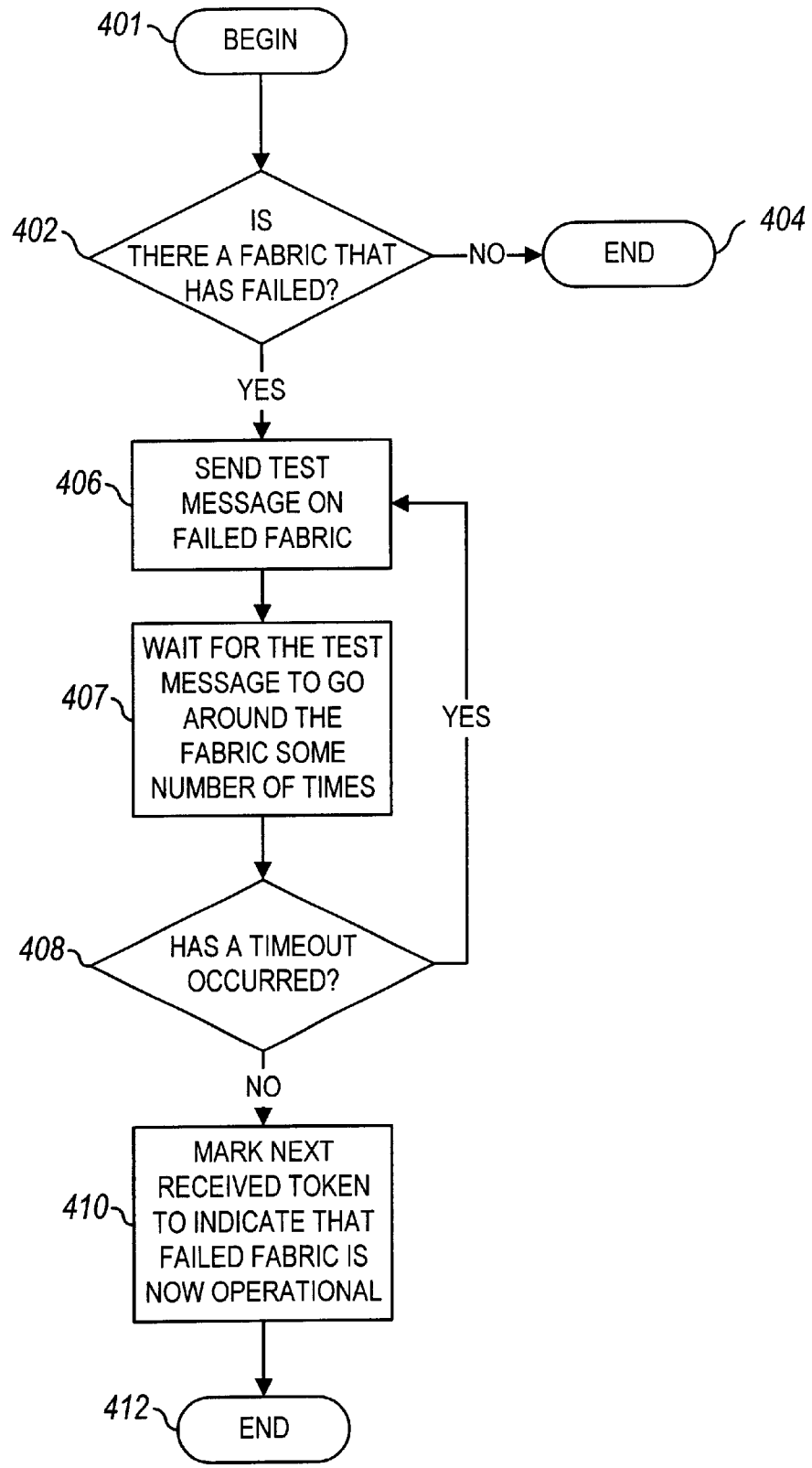
FIG. 4 is a flow chart illustrating control logic for marking a token used in connection with a ring master device connected to the network of FIG. 1 to indicate that a fabric previously determined to have failed has become operational.
Figure 5:
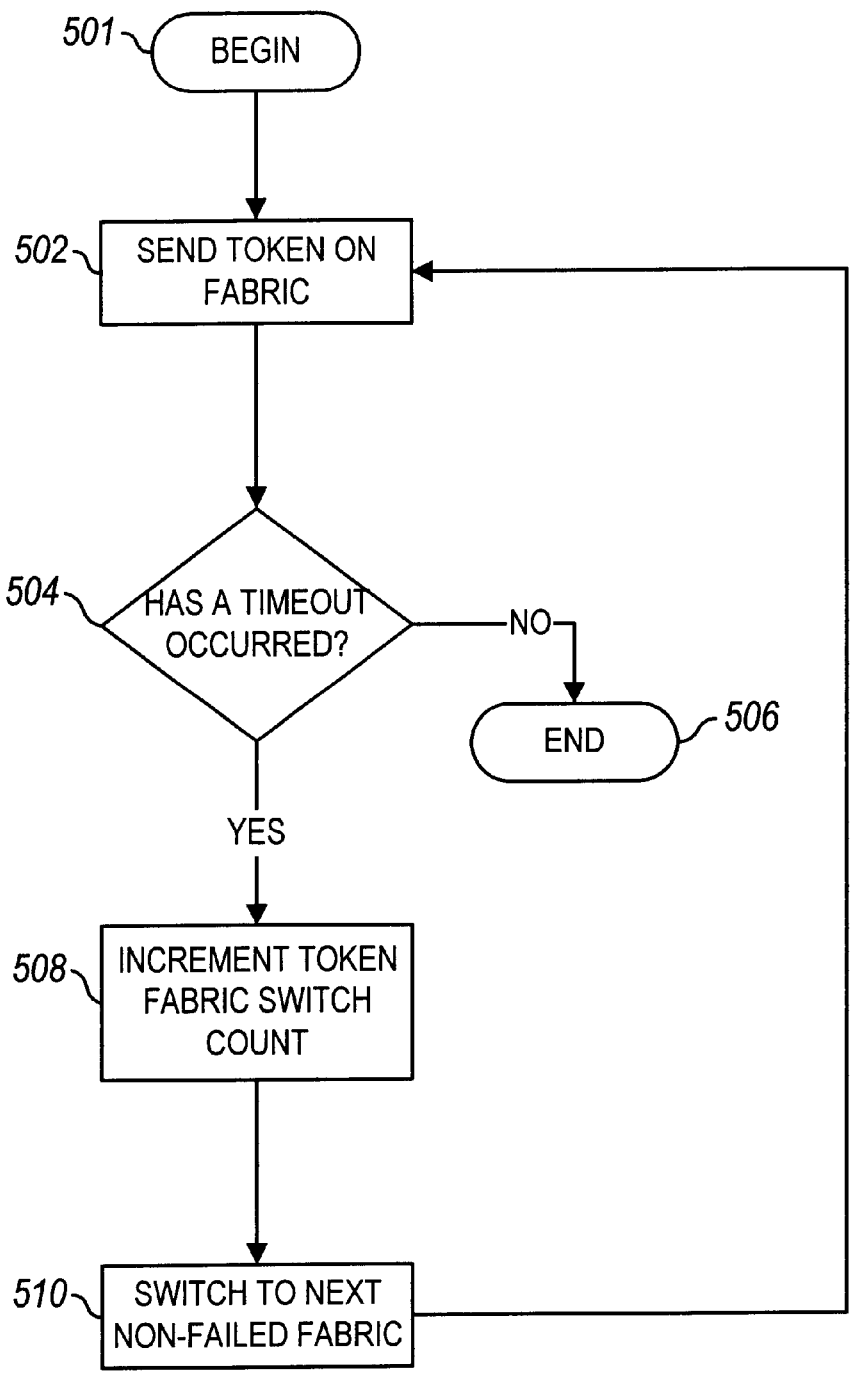
FIG. 5 comprises a flow chart illustrating control logic for switching fabrics by a communication device connected to the network of FIG. 1.

FIGS. 3–5 are flowcharts of control logic implemented by the devices 114, 116, and 118, for managing the plurality of fabrics 102 and 104 in accordance with the present invention.

FIG. 3 is a flow chart of control logic that can be implemented on the ring master device 116 to operate as a failed-fabric detector in accordance with the present invention. The control logic will be exemplified by showing how a fabric failure is detected by the ring master device 116, resulting in the marking of the token 200 to indicate that a fabric 102 or 104 has failed.

In step 302, the ring master device 116 receives the token 200 from the device 118 on fabric 102. Execution then proceeds to step 304. In step 304, the ring master device 116 determines whether the token 200 is intended for the ring master device 116. If the ring master device 116 determines that the token 200 is intended for the ring master device 116, execution proceeds to step 308. If the ring master device 116 determines that the token 200 is not intended for the ring master device 116, execution proceeds to step 306 and terminates.

In step 308, a determination is made whether a token fabric switch count, stored in the field 206 of the token 200, is equal to zero. The token fabric switch count 206 is incremented when a timeout occurs after a device 114, 116, or 118 has transmitted the token 200 on one of the fabrics 102 or 104 and has not received the token 200 within a predetermined amount of time thereafter, such as within one millisecond. The token fabric switch count 206 is set to zero at step 320 by the ring master device 116 every rotation of the token 200 on the network 100. Thus, the token fabric switch count 206 stores the number of times that a fabric switch for a particular fabric 102 or 104 has occurred during a token 200 rotation around the network 100.

If, in step 308, the token fabric switch count 206 is equal to zero, execution proceeds to step 309. If the token fabric switch count 206 is not equal to zero, execution proceeds to step 312.

In step 309, the local fabric switch count 120 for the fabric the token was originally sent on is set to zero because the token made a successful pass through the fabric without any retransmissions.

In step 312, a determination is made whether the total local fabric switch count 120 for the fabric 102 exceeds a predetermined number, such as 3. Other algorithms may be used for detecting poorly performing fabrics, such as counting the number of tokens which have been dropped during an immediately preceding few seconds. The total local fabric switch count 120 is stored by the ring master device 116, and reflects the number of token 200 rotations during which a token 200 transmitted by the ring master 116 on the fabric 102 has been switched by another device 114 or 118 to the fabric 104.

If, in step 312, the predetermined number of switches has not occurred, execution proceeds to step 314. In step 314, the total local fabric switch count 120 for fabric 102 is incremented, and execution then proceeds to step 310. In step 310, the token 200 is processed in a well-known manner in accordance with conventional Totem Ring network technology.

If, in step 312, more than a predetermined number of switches have occurred for the fabric 102, execution proceeds to step 316. In step 316, the token 200 is marked to indicate that fabric 102 has failed.

From step 316, execution proceeds to step 318. In step 318, the local token fabric switch count 206 is set to zero. Execution then proceeds to step 310, discussed above. From step 310, execution proceeds to step 320, wherein the token fabric switch count 206 is set to zero. From step 320, execution proceeds to step 322, wherein the token is transmitted on the next non-failed fabric. For example, if the token 200 had been transmitted on the fabric 102, in step 322, the token 200 may next be transmitted on the fabric 104. Upon completion of step 322, execution proceeds to step 324 and is terminated.

FIG. 4 is a flow chart of control logic that can be implemented on the ring master device 116 to permit it to operate as a detector of a fabric 102 or 104 that has failed and has subsequently become operational. The control logic will be exemplified by showing how a formerly-failed fabric that has now become operational is detected by a ring master device 116, resulting in the marking of a token 200 to indicate that the formerly-failed fabric 102 or 104 is now operational.

Referring to FIG. 4, execution is initiated at step 401 and proceeds to step 402 wherein a determination is made whether the token 200 was marked in step 316 to indicate that the fabric 102 or 104 has failed. If it is determined that a fabric 102 or 104 has failed, then execution proceeds to step 406; otherwise, execution terminates at step 404.

In step 406, the ring master transmits a test message on the fabric 102 or 104 on which a failure has been detected. The test message will be transmitted around the fabric in the same order as a normal token by the devices on the network. The ring master will receive and retransmit the test message and count the number of times it has done this. Execution proceeds to step 407 where the ring master waits for the test message to go around the fabric some preferable large (i.e. 100) number of times. Execution then proceeds to step 408, wherein a determination is made whether a timeout has occurred (i.e., whether the test message did not go around the fabric in time), a timeout being defined as the expiration of a predetermined time period that would normally allow the test message to go around the ring the number of times required without the ring master device 116 having received a response to the test message on the failed fabric 102 or 104. If the predetermined time period has not been exceeded, execution returns to step 406. If, in step 408, it is determined that the predetermined time period has not been exceeded, execution continues to step 410. In step 410, the token 200 is marked to indicate that the fabric 102 or 104 that had failed is now operational and available for use by devices 114, 116, and 118. Upon completion of step 410, execution terminates at step 412.

FIG. 5 is a flow chart of control logic that may be implemented on devices 114 and 118 to permit them to operate as a fabric switch in accordance with the present invention. The control logic will be exemplified by showing how the fabric 102 or 104 on which a token 200 is transmitted may be switched by a device 114 or 118 and a token fabric switch count 206 incremented in response to detection of a timeout.

Referring to FIG. 5, execution is initiated in step 501 and proceeds to step 502, wherein a token 200 is sent by a device 114 or 118 on a fabric 102 or 104. Execution then proceeds to step 504.

In step 504, a determination is made whether a timeout has occurred, a timeout occurring when a predetermined amount of time (a timeout value) has elapsed before device 114 or 118 has received a token 200. Such timeout value is set to the worst-case time it would take the token to go around the ring under normal operation. If it is determined that a timeout has not occurred, execution terminates at step 506. If, in step 504, it is determined that a timeout has occurred, execution proceeds to step 508. In step 508, a token fabric switch count 206 is incremented. The token fabric switch count counts the number of times that transmission of the token 200 has been switched from one of the fabrics 102 or 104 to another of the fabrics 102 or 104. Execution then proceeds to step 510.

In step 510, the device 114 or 118 switches to another non-failed fabric 102 or 104 for transmission of the token, depending on which fabric 102 or 104 the token was received by device 114 or 118 on. Execution then returns to step 502.

By the practice of the present invention, fault tolerance of Totem ring networks is provided, which enhances the probability that sequentially-transmitted messages will be properly delivered across the-Totem ring network. Because there are multiple redundant fabrics on which tokens and messages may be transmitted, in the event one or more of the fabrics fails, tokens and messages can still be transmitted on the network. Because the present invention also provides for detection of the repair of a failed fabric, once a formerly-failed fabric becomes operational, the network is alerted that the fabric is now operational and devices on the network are able to use the fabric, thus resulting in increased bandwidth and fault tolerance of the network.

It is understood that the present invention can take many forms and embodiments. Accordingly, several variations may be made in the foregoing without departing from the spirit or the scope of the invention. For example, any number of fabrics, devices, and ring master devices can be used, so long as multiple or redundant fabrics are utilized to provide redundancy in the totem network.

Other methods may be employed to determine that a specific fabric has failed. For example, the number of times a token switch has occurred on a specific fabric over a period of time may be counted, or a device at which failures occurred may be recorded, to more accurately identify poorly performing fabrics and to report the location of failure more accurately.

Other fabric recovery mechanisms may also be employed. For example, a response may be individually requested from each device in the network.

For improved performance in the event of a failure, tokens and messages may be sent on multiple fabrics, or on all fabrics, simultaneously so that if a token is lost on one fabric it may be received on another fabric.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for providing fault tolerance in a Totem network, comprising the steps performed by a device operably connected on the network of:

receiving a token transmitted on a first fabric of a plurality of fabrics of the network;

determining whether the number of times that a token has been switched from the first fabric to a second fabric of the plurality of fabrics exceeds a predetermined number;

upon a determination that the number of times that a token has been switched exceeds a predetermined number, marking the token to indicate that at least one of the plurality of fabrics has failed; and setting the number of fabric switches stored on the token to zero in response to the indication that at least one of the fabrics has failed.

2. A method for providing fault tolerance in a Totem network, comprising the steps performed by a device operably connected on the network of:

receiving a token transmitted on a first fabric of a plurality of fabrics of the network;

determining whether the number of times that a token has been switched from the first fabric to a second fabric of the plurality of fabrics exceeds a predetermined number;

upon a determination that the number of times that a token has been switched exceeds a predetermined number, marking the token to indicate that at least one of the plurality of fabrics has failed;

setting a fabric switch count stored on the token to zero in response to the indication that at least one of the fabrics has failed; and transmitting the token on a second fabric of the plurality of fabrics of the network.

3. A Totem ring master device comprising:

a processor for processing messages and tokens;

at least one first interface connectable to each fabric of a plurality of fabrics comprising a Totem ring network;

means for determining whether the number of times the token has been switched from a first fabric to a second fabric of the plurality of fabrics exceeds a predetermined number, thereby indicating that at least one of the plurality of fabrics has failed; and means for setting the number of fabric switches stored on the token to zero in response to the indication that at least one of the fabrics has failed.

4. A Totem ring master device comprising:

a processor for processing messages and tokens;

at least one first interface connectable to each fabric of a plurality of fabrics comprising a Totem ring network;

means for determining whether the number of times the token has been switched from a first fabric to a second fabric of the plurality of fabrics exceeds a predetermined number, thereby indicating that at least one of the plurality of fabrics has failed;

means for setting a fabric switch count stored on the token to zero in response to the indication that at least one of the fabrics has failed; and means for transmitting the token on a second fabric of the plurality of fabrics of the network.

* * * * *